(12) United States Patent
Danilov et al.

(10) Patent No.: US 11,023,129 B2
(45) Date of Patent: Jun. 1, 2021

(54) HYBRID INTRA-CLUSTER MIGRATION OF DATA BETWEEN STORAGE DEVICES USING CHUNK USAGE EFFICIENCY

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP Holding Company LLC, Hopkinton, MA (US)

( * ) Notice: Subject to any disclaimer, the term of this patent is extended or adjusted under 35 U.S.C. 154(b) by 31 days.

(21) Appl. No.: 16/207,754

(22) Filed: Dec. 3, 2018

(65) Prior Publication Data
US 2020/0174666 A1 Jun. 4, 2020

(51) Int. Cl.
*G06F 3/06* (2006.01)

(52) U.S. Cl.
CPC .......... *G06F 3/0604* (2013.01); *G06F 3/0638* (2013.01); *G06F 3/0673* (2013.01)

(58) Field of Classification Search
CPC ..... G06F 3/0604; G06F 3/0638; G06F 3/0673
See application file for complete search history.

(56) References Cited

U.S. PATENT DOCUMENTS

| | | | |
|---|---|---|---|
| 8,156,306 B1 | 4/2012 | Raizen et al. | |
| 8,239,621 B2 | 8/2012 | Yamato | |
| 9,477,407 B1 | 10/2016 | Marshak et al. | |
| 9,733,844 B2 | 8/2017 | Gong et al. | |
| 10,235,053 B1 | 3/2019 | Derbeko et al. | |
| 10,521,119 B1 * | 12/2019 | Danilov | G06F 3/0644 |
| 2010/0070466 A1 | 3/2010 | Prahlad | |
| 2014/0297964 A1 | 10/2014 | Nakase | |
| 2017/0024161 A1 | 1/2017 | Katiyar et al. | |
| 2017/0031710 A1 | 2/2017 | Kuik et al. | |
| 2017/0147227 A1 | 5/2017 | Stabrawa et al. | |

(Continued)

OTHER PUBLICATIONS

Non-Final Office Action received for U.S. Appl. No. 16/007,419 dated Nov. 6, 2019, pages, 49 pages.

(Continued)

*Primary Examiner* — Tuan V Thai
(74) *Attorney, Agent, or Firm* — Amin, Turocy & Watson, LLP

(57) ABSTRACT

Hybrid intra-cluster migration of data in an elastic cloud storage (ECS) environment is disclosed herein. A system comprises a processor and a memory that stores executable instructions that, when executed by the processor, perform operations that include moving a first data chunk from a first storage device to a second storage device during a data migration, based on a first determination that a first use efficiency of the first data chunk satisfies a defined use efficiency threshold. The operations also include moving a first data segment from a second data chunk in the first storage device to a third data chunk in the second storage device during the data migration, based on a second determination that a second use efficiency of the second data chunk fails to satisfy the defined use efficiency threshold. The first data segment includes data that is open for new writes and a second data segment includes data that is not open for new writes. After data is moved, capacity of the first data chuck is recovered. Moving the first data chunk preserves a chunk identifier of the first data chunk.

20 Claims, 11 Drawing Sheets

(56) References Cited

U.S. PATENT DOCUMENTS

| | | | |
|---|---|---|---|
| 2017/0177652 A1* | 6/2017 | Danilov | G06F 3/0608 |
| 2017/0285952 A1* | 10/2017 | Danilov | G06F 12/0246 |
| 2018/0165190 A1* | 6/2018 | Danilov | G06F 3/0608 |
| 2018/0181487 A1* | 6/2018 | Danilov | G06F 12/0276 |
| 2019/0155922 A1 | 5/2019 | Kim et al. | |
| 2019/0171577 A1 | 6/2019 | Arcangeli et al. | |
| 2019/0213175 A1 | 7/2019 | Kong et al. | |
| 2019/0258586 A1 | 8/2019 | Beaverson et al. | |
| 2019/0303035 A1* | 10/2019 | Danilov | G06F 3/0604 |
| 2019/0384519 A1* | 12/2019 | Danilov | G06F 3/0604 |

OTHER PUBLICATIONS

Notice of Allowance received for U.S. Appl. No. 16/007,419 dated Mar. 11, 2020, 25 pages.

* cited by examiner

HYBRID INTRA-CLUSTER MIGRATION OF DATA BETWEEN STORAGE DEVICES USING CHUNK USAGE EFFICIENCY

TECHNICAL FIELD

The subject disclosure relates generally to data storage. More specifically, the subject disclosure relates to data storage for Elastic Cloud Storage (ECS) devices.

BACKGROUND

Distributed storage systems and/or object storage systems can provide a wide range of storage services while achieving high scalability, availability, and serviceability. An example of such storage systems is referred to as ECS, which uses the latest trends in software architecture and development to achieve the above noted services, as well as other services.

To move data between storage devices, the data has been traditionally moved at an object level. However, ECS operates at a chunk level, not an object level. Therefore, when data is moved in an ECS at an object level, repeated replication of an entire data set is necessary. Further, a complete rebuild of the largest Data Table (DT), such as an Object Table, is also necessary, which can cause a large amount of garbage that needs be collected. Accordingly, unique challenges exist to provide performance and processing efficiency for migration of data retained in storage devices of an ECS system.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In one embodiment, provided herein is a method that comprises determining, by a system comprising a processor, a use efficiency of a data chunk of a first storage device, based on a first determination that the data chunk is to be migrated to a second storage device. The method also comprises performing, by the system, an action of a group of actions. The group of actions comprise moving, by the system, the data chunk from the first storage device to the second storage device based on a result of a second determination indicating that the use efficiency of the data chunk satisfies a threshold level. The group of actions also comprise moving, by the system, a first set of data of the data chunk from the first storage device to the second storage device based on a result of a second determination indicating that the use efficiency of the data chunk satisfies a threshold level, wherein a second set of data of the data chunk is not moved.

According to some implementations, the data chunk is a first data chunk, and moving the first set of data comprises moving the first set of data from the first data chunk in the first storage device to a second data chunk in the second storage device. Further to these implementations, the method comprises updating, by the system, a location information for the first set of data to point to the second data chunk in the second storage device. According to some implementations, the method comprises, after moving the first set of data, recovering, by the system, a capacity of the first data chunk in the first storage device.

In an example implementation, moving the data chunk comprises preserving a chunk identifier of the data chunk. According to another example implementation, moving the data chunk comprises moving the data chunk, a coding location associated with the data chunk, and a chunk identifier associated with the data chunk from a first block in the first storage device to a second block in the second storage device. Further to this example implementation, the method comprises removing, by the system, the first block from the first storage device, where the first block is a storage block.

According to some implementations, the method further comprises, prior to moving the data chunk, or prior to moving the first set of data, determining, by the system, that the data chunk comprises immutable data.

The first set of data can comprise live data that is referenced, and the second set of data can comprise dead data that is not referenced. Further, the first storage device and the second storage device can be geographically distributed devices.

Another embodiment relates to a system that comprises a processor and a memory that stores executable instructions that, when executed by the processor, cause the processor to perform operations. The operations comprise moving a first data chunk from a first storage device to a second storage device during a data migration, based on a first determination that a first use efficiency of the first data chunk satisfies a defined use efficiency threshold. The operations can also comprise moving a first data segment from a second data chunk in the first storage device to a third data chunk in the second storage device during the data migration, based on a second determination that a second use efficiency of the second data chunk fails to satisfy the defined use efficiency threshold, where the first data segment comprises referenced data that is open for new writes.

In accordance with some implementations, the operations further comprise updating information indicative of a location of the first data segment to the location of the third data chunk in the second storage device. According to some implementations, the operations further comprise, after moving the first data segment, deleting the second data chunk from the first storage device, and reacquiring a capacity of the second data chunk within the first storage device.

In some implementations, the operations further comprise retaining a second data segment of the second data chunk in the first storage device, where the second data segment comprises data not open for new data writes.

According to some implementations, the operations further comprise moving a second data segment from the second data chunk in the first storage device to the third data chunk in the second storage device during the data migration, where the second data segment comprises the referenced data that is open for new writes. Further, the operations comprise retaining a third data segment in the second data chunk in the first storage device, where the third data segment is not open for new writes.

In some implementations, the referenced data is first referenced data, and the operations further comprise, moving a second data segment from a fourth data chunk in the first storage device to the third data chunk in the second storage device during the data migration, based on a third determination that a third use efficiency of the fourth data chunk fails to satisfy the defined use efficiency threshold, where the fourth data chunk comprises second referenced data that is open for new writes.

In some implementations, prior to moving the first data chunk and moving the first data segment, the operations further comprise determining that the first data chunk and the second data chunk comprise immutable data.

Another embodiment relates to a computer-readable storage medium comprising instructions that, in response to execution, cause a system comprising a processor to perform operations. The operations comprise determining a first data chunk is to be migrated from a first storage node device to a second storage node device, where the first data chunk is determined to comprise a use efficiency level that fails to satisfy a defined use efficiency level, and the first data chunk comprises a first data segment, a second data segment, a third data segment, and a fourth data segment. The operations also comprise moving the first data segment, the second data segment, and the fourth data segment to a second data chunk in the second storage node device based on a first determination that the first data segment, the second data segment, and the third data segment comprise respective referenced data. In addition, the operations comprise deleting the fourth data segment from the first data chunk based on a second determination that the fourth data segment does not comprise referenced data.

According to some implementations, the operations further comprise updating respective location information for the first data segment, the second data segment, and the third data segment, where the respective location information comprises a reference to the second data chunk in the second storage node device.

In accordance with some implementations, the operations further comprise moving the first data chunk from the first storage node device, and regaining a capacity of the first data chunk in the first storage node device.

The following description and the annexed drawings set forth in detail certain illustrative embodiments of the subject matter. However, these embodiments are indicative of but a few of the various ways in which the principles of the subject matter can be employed. Other embodiments, advantages, and novel features of the disclosed subject matter will become apparent from the following detailed description when considered in conjunction with the drawings. It should also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
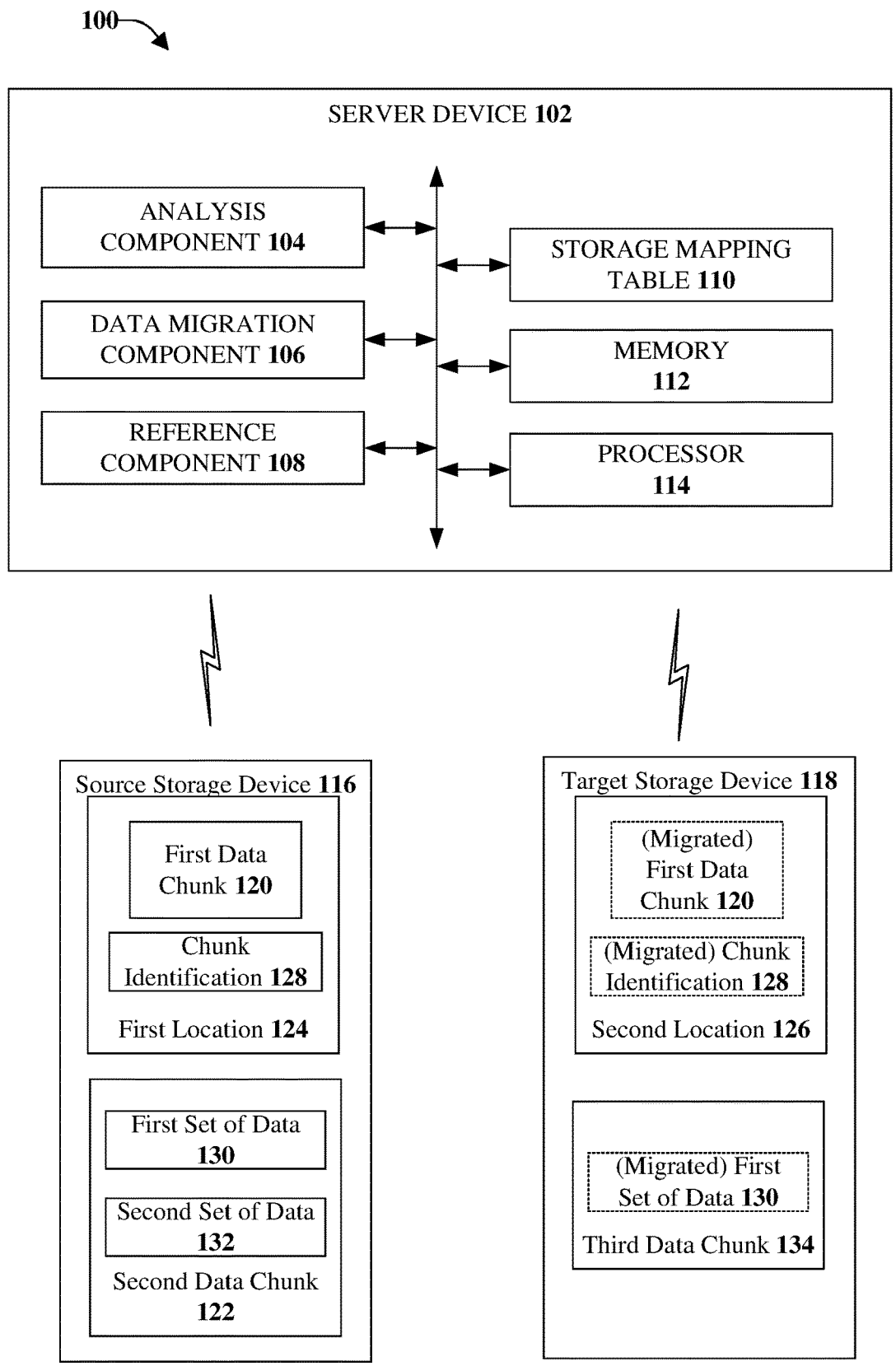
FIG. 1 illustrates an example, non-limiting, system for hybrid intra-cluster migration of data between storage devices in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As mentioned, a wide range of data storages are available. One example of data storage is ECS, which is a cluster-based object storage. An approach for ECS cluster hardware upgrade, referred to as intra-cluster migration, can work at the chunk level. This intra-cluster migration can have low efficiency when a significant part of one or more chunks is poorly used. Described herein is a hybrid approach to intra-cluster migration. The disclosed embodiments can implement a higher level of efficiency via a combination of intra-cluster migration and copying garbage collection for chunks.

ECS uses cutting-edge technology to implement many of its functions. In particular, ECS uses a specific method for disk capacity management and does not solely rely on a file system. The disk space is partitioned into a set of blocks of fixed size, referred to as "chunks." All the information, user data, and different kinds of metadata, are stored in these chunks. Further, chunk content can be modified in append-only mode. When a chunk becomes full (e.g., based on a defined used amount of space), the chunk is sealed. Content of a sealed chunk is immutable.

There are different types of chunks, one type of chunk per capacity use (e.g., user data, metadata). In particular, user data is stored in repository chunks (or simply repo chunks). The metadata is stored in tree-like structures, referred to as "tree chunks." Chunks of the one or more types (e.g., repo chunks and tree chunks) are shared. For example, a repo chunk can contain segments of several user objects and a tree chunk can contain elements of several trees.

ECS runs a set of storage services, which together implement business logic of storage, which is referred to as "blob service." Blob service maintains an object table that keeps track of all objects in the system. In particular, the object table contains location information for the objects. There is also a chunk manager service that maintains a chunk table. As indicated by its name, ECS is a cloud storage. The corresponding feature is called GEO since ECS supports geographically distributed setups consisting of two or more zones.

ECS is a hardware appliance product and products of this type sooner or later face the problem of hardware upgrade (e.g., change of generation). In some cases, legacy data is moved from old nodes to new nodes at the object level. This approach is simple and practical to implement, however, for ECS this approach to movement of legacy data requires repeated replication of an entire data set since replication in ECS works at the chunk level. In addition, this type of implementation would require complete rebuild of the largest DT (e.g., Object Table). This approach would produce a huge amount of garbage to collect for a slow garbage collector. Accordingly, the various embodiments provided herein can implement Intra-Cluster Migration (ICM) at the chunk level using a hybrid approach to ICM for ECS. The various embodiments can provide seamless and resource-efficient upgrades of ECS cluster hardware. The various embodiments can provide a hybrid approach that combines ICM with copying garbage collection.

According to various aspects, when a chunk is moved from old nodes to new nodes, a use of efficiency of the data chunk can be evaluated to determine if the entire chunk should be moved "as is," or whether only a subset of the data chunk should be moved (e.g., used portions of the data chunk can be moved while unused portions of the data chunk are not moved). The use efficiency of the data chunk can be defined as an amount of used capacity of the data chunk divided by a size of the data chunk (e.g., used capacity/chunk size).

Thus, when a data chunk is to be moved from old nodes to new nodes, the chunk can preserve its chunk ID if a use efficiency of the data chunk is at or above a threshold level. Preservation of the chunk content and the chunk ID can allow for the elimination of repeated replication of the data. In addition, such a move can allow that the location of existing objects does not need to be updated. It is noted that BS (Blob Service) keeps track of not physical but logical objects' locations. Each particular object segment is addressed relative to a chunk, identified with its chunk ID.

Alternatively, or additionally, if the use efficiency of the data chunk is below the threshold level, according to various aspects, live data from the data chunk can be moved to a new chunk allocated with a new node. Dead data from the data chunk is not moved. The old data chunk can be deleted, and its capacity can be reclaimed.

FIG. 1 illustrates an example, non-limiting, system 100 for hybrid intra-cluster migration of data between storage devices in accordance with one or more embodiments described herein. The system 100 (as well as other systems discussed herein) can be implemented as a data storage and/or storage system that supports hybrid intra-cluster migration. Thus, the system 100 can facilitate the migration of data across geographically distributed systems that comprise two or more zones.

The system 100 (and other systems discussed herein) can be utilized to implement hybrid intra-cluster migration, which can increase a resource efficiency of a hardware upgrade. Namely, the embodiments provided herein combine intra-cluster migration with copying garbage collection to solve the problem of low efficiency for poorly used chunks. Further, the embodiments include a hardware upgrade that is practical to implement.

The system 100 includes a server device 102 that can perform data migration between different storage zones as discussed herein. The server device 102 includes an analysis component 104, a data migration component 106, a reference component 108, a storage mapping table 110, at least one memory 112, and at least one processor 114. According to some implementations, the storage mapping table 110 is included, at least partially, in the at least one memory 112.

The server device 102 can interact with a first storage device (e.g., a source storage device 116) and at least a second storage device (e.g., a target storage device 118). The source storage device 116 and the target storage device 118 can be geographically distributed devices. In an example, the source storage device 116 is located in a first zone and the target storage device 118 is located in a second zone. It is noted that although the various embodiments are discussed with respect to two storage devices, migration between more than two storage devices can be implemented with utilization of the disclosed aspects.

In some implementations, the storage devices (e.g., the source storage device 116, the target storage device 118, and subsequent storage devices) can be referred to as geographically distributed setups or zones (e.g., a first zone, a second zone, and/or subsequent zones). Further, although the server device 102 is illustrated and described as a component separate from the source storage device 116 and the target storage device 118, the server device 102 can be included, at least partially, in the source storage device 116 and/or the target storage device 118. In some implementations, the storage devices includes the functionality of the server device. For example, the source storage device 116 can include a first server device (that includes the functionality of the server device 102) and the target storage device 118 can include a second server device (that includes the functionality of the server device 102). Accordingly, the first server device and the second server device can be in communication with one another but can operate independently from one another.

As used herein, the term "storage device," "first storage device," "storage system," and the like, can include, for example, private or public cloud computing systems for storing data, as well as systems for storing data comprising virtual infrastructure and those not comprising virtual infrastructure. The term "I/O request" (or simply "I/O") can refer to a request to read and/or write data.

The term "cloud" as used herein refers to a cluster of nodes (e.g., set of network servers), for example, within a distributed object storage system, that are communicatively and/or operatively coupled to one another, and that host a set of applications utilized for servicing user requests. In general, the cloud computing resources communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" refers to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

The analysis component 104 can determine use efficiencies of data chunks of the source storage device 116 based on a determination that one or more data chunks (e.g., a first data chunk 120 and/or a second data chunk 122) is to be moved from the source storage device 116 (e.g., a source storage node, a source storage node device) to the target storage device 118 (e.g., a target storage node, a target storage node device). For example, the analysis component 104 can evaluate a use efficiency of the first data chunk 120 and/or a use efficiency of the second data chunk 122 (or respective use efficiencies of multiple data chunks) based on a determination that the source storage device 116 is to be replaced, at least partially, with the target storage device 118. Therefore, at least a portion of the data stored in the source storage device 116 should be moved to the target storage device 118.

Based on the use efficiency determined by the analysis component 104, the data migration component 106 can perform the migration of the first data chunk 120 from a first location 124 in the source storage device 116 to a second location 126 in the target storage device 118. For example, based on a result of a determination by the analysis component 104 that the use efficiency of the first data chunk 120 satisfies a threshold level, the data migration component 106 can move the first data chunk 120 from the source storage device 116 to the target storage device 118. The first data chunk 120 can be moved "as is," preserving its chunk identifier (ID). For example, data indicative of an identity of the data chunk (e.g., chunk identification 128) can be migrated at substantially the same time as the first data chunk 120 is migrated from the source storage device 116 to the target storage device 118.

For example, the storage mapping table 110 can include a mapping or cross reference between a data chunk and its storage location. Therefore, a location of the first data chunk 120 stored within the storage mapping table 110 can be updated, by the reference component 108, upon or after the first data chunk 120 is migrated from the source storage device 116 to the target storage device 118. For example, a mapping indicating the first data chunk 120 is stored at the first location 124 can be replaced with another mapping indicating the first data chunk 120 is stored at the second location 126.

According to some implementations, the reference component 108 can also update a mapping of a first reference to the first location 124 for the identity of the data chunk (e.g., the chunk identification 128) from the storage mapping table 110. Further, the reference component 108 can add the second reference to the second location 126 for the identity of the data chunk (e.g., the chunk identification 128) to the storage mapping table 110.

Alternatively, based on a result of a determination by the analysis component 104 that the use efficiency of a data chunk (e.g., the second data chunk 122) fails to satisfy the threshold level, the data migration component 106 can move a first set of data 130 of the second data chunk 122 from the source storage device 116 to the target storage device 118. Further, a second set of data 132 of the second data chunk 122 is not moved. The first set of data 130 can be data that is determined to be "live" data and the second set of data 132 can be data that is determined to be "dead" data. Further information related to the live and dead designations will be provided below.

For example, the storage mapping table 110 can include a mapping or cross reference between sets of data (e.g., portions, data segments) of a data chunk and its storage location. Therefore, a location of the first set of data 130 stored within the storage mapping table 110 can be updated, by the reference component 108, upon or after the first set of data 130 is migrated from the source storage device 116 to the target storage device 118. For example, a mapping indicating the first set of data 130 within the second data chunk 122 can be replaced with another mapping indicating the first set of data 130 is stored in a third data chunk 134.

It is noted that although various embodiments are discussed with respect to an entire data chunk that is moved, as well as portions of another data chunk that are moved to another storage device, the disclosed embodiments are not limited to this implementation. Instead, in some implementations, only portions of data chunks are moved (e.g., there is not an entire data chunk that is moved).

In further detail, the disclosed embodiments provide hybrid intra-cluster migration for ECS, which does not employ traditional monolithic storage architecture. ECS applies some key elements of Microservice Architecture pattern. According to this pattern, complex software systems are composed of rather small and highly decoupled processes called microservices. The processes are called microservices because each of the processes is small and narrowly focused on doing a single small task. In real life, it is almost impossible to implement a system as a set of absolutely independent processes. Therefore, microservices communicate with each other using language-agnostic APIs.

In some cases, the storage devices (e.g., the source storage device 116 and the target storage device 118) can be included in respective storage clusters, which can include one or more services and/or one or more storage devices. In some embodiments, a storage device can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" refers to any system or person that can send I/O requests to a storage system. For example, an entity, can be one or more computers, the Internet, one or more systems, one or more commercial enterprises, one or more computers, one or more computer programs, one or more machines, machinery, one or more users, one or more customers, one or more humans, and so forth, hereinafter referred to as an entity or entities depending on the context.

With continuing reference to the server device 102, the at least one memory 112 is operatively coupled to the at least one processor 114. The at least one memory 112 can store protocols associated with migration of data in a data storage environment as discussed herein. Further, the at least one memory 112 can perform actions to control communication between the server device 102 and the one or more storage devices (e.g., the source storage device 116, the target storage device 118), such that the system 100 can employ stored protocols and/or algorithms to achieve improved storage management through data migration as described herein.

It should be appreciated that data store components (e.g., memories) described herein can be either volatile memory, nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchronous Link DRAM (SLDRAM), and Direct Rambus® RAM (DRRAM). Memory as discussed herein is intended to comprise, without being limited to, these and other suitable types of memory.

The at least one processor 114 can process data related to data migration as discussed herein. The at least one processor 114 can be a processor dedicated to analyzing and/or generating information received, a processor that controls one or more components of the system 100, and/or a processor that both analyzes and generates information received and controls one or more components of the system 100.

Figure 2:
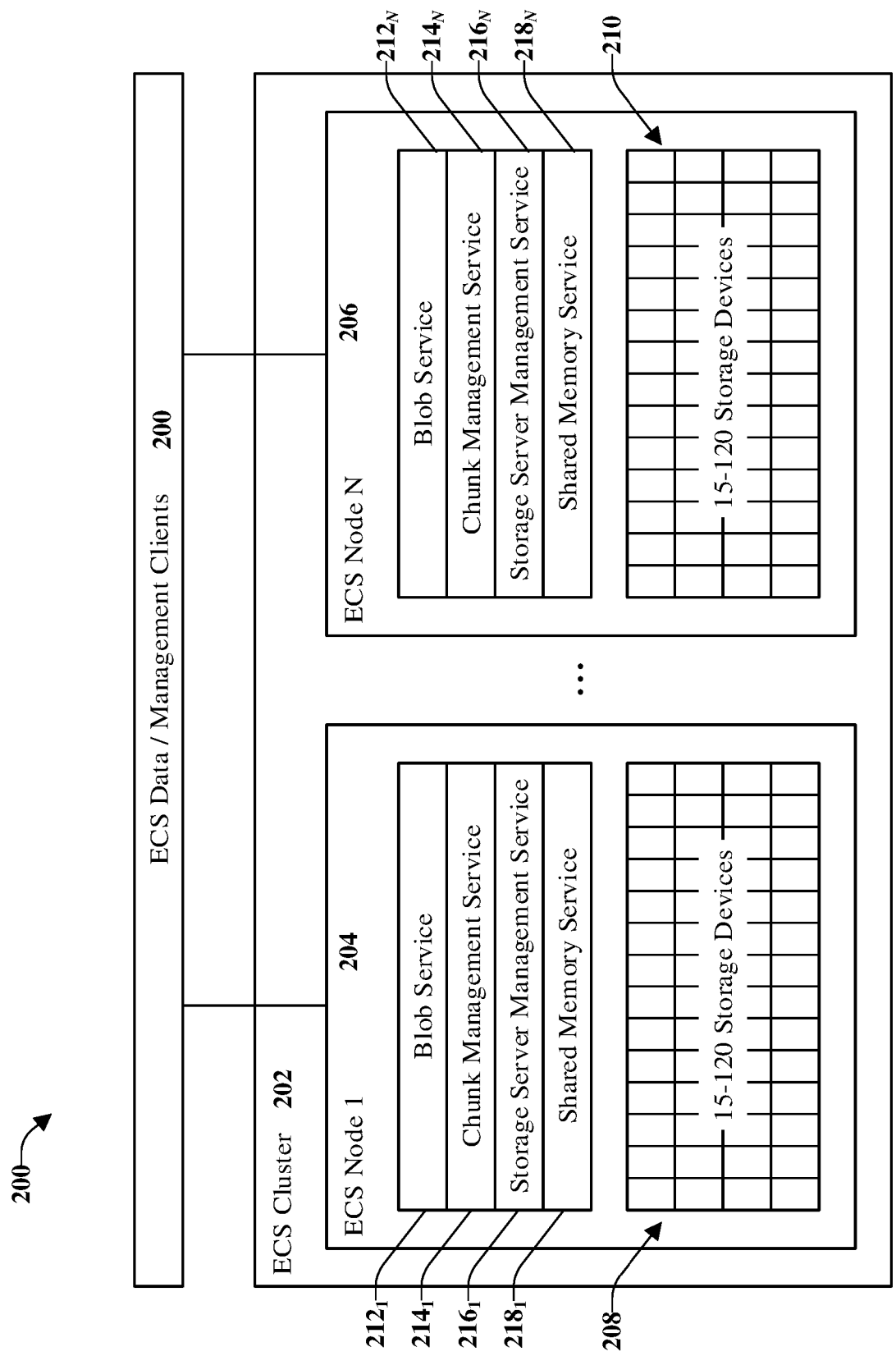
FIG. 2 illustrates a high-level architecture of storage devices in accordance with one or more embodiments described herein.

FIG. 2 illustrates a high-level architecture of ECS in accordance with one or more embodiments described herein. ECS data/management clients 200 can be serviced by an ECS cluster 202 that comprises several (N) nodes, illustrated as a first ECS Node 204 (or ECS Node 1) through an Nth ECS Node 206 (or ECS Node N), where N is an integer. The nodes (e.g., the first ECS Node 204 through the Nth ECS Node 206) can manage several storage devices (e.g. hard drives), illustrated as a first set of storage devices 208 and an Nth set of storage devices 210. It is noted that a single ECS node can manage from around fifteen to about one hundred and twenty storage devices, for example.

The ECS nodes (e.g., the first ECS Node 204, the Nth ECS Node 206) can run a number of services. In FIG. 2, only four service blocks are illustrated for purposes of simplicity. In reality, a single node that runs ECS can manage about twenty (or more) independent services. For purposes of describing the one or more aspects or embodiments, the illustrated services are a blob service 212, a chunk management service 214, a storage server management service 216, and a shared memory service 218.

The blob service 212 (e.g., Blob Service (BS)) can keep track of all objects in the system. For the chunk management service 214 (e.g., Chunk Manager (CM)), all disk space in ECS is partitioned into a set of blocks of fixed size called chunks. All the information, user data and a variety of metadata, is stored in these chunks. Chunks are shared. The chunks can be modified in append-only mode and once a chunk is full enough it becomes immutable. CM is the service that manages chunks. The storage server management service 216 (e.g., Storage Service Manager (SSM)) keeps track of free and used blocks. Further the shared memory service 218 (e.g., Shared Memory Service (also referred to as VNest)) can guarantee a single view on cluster-level data for all cluster nodes. VNest guarantees that at least V nodes (normally five) called members share the same view on the cluster state.

ECS does not use traditional databases to store metadata and system data. Instead, ECS uses a homemade search tree implementation to store the metadata and system data. Storage services can maintain one or multiple Directory Tables (DT), where a DT is a union of around one hundred and twenty-eight search trees (also referred to as partitions). Ownership over partitions is more or less evenly distributed among cluster nodes. For example, BS maintains Object Table (OT), CM maintains Chunk Table (CT), SSM maintains SSM Table (SSMT).

As mentioned, ECS is a hardware appliance product and products of this type sooner or later face the problem of hardware upgrade (e.g., change of generation). When the product is moved to different hardware (e.g., moved between storage devices, moved from old nodes to new nodes), the hardware upgrade should be seamless. That is, there should be no disruption of service and there should be no severe performance degradation. The disclosed embodiments can be utilized to provide for the seamless upgrade of ECS cluster hardware.

Figure 3:
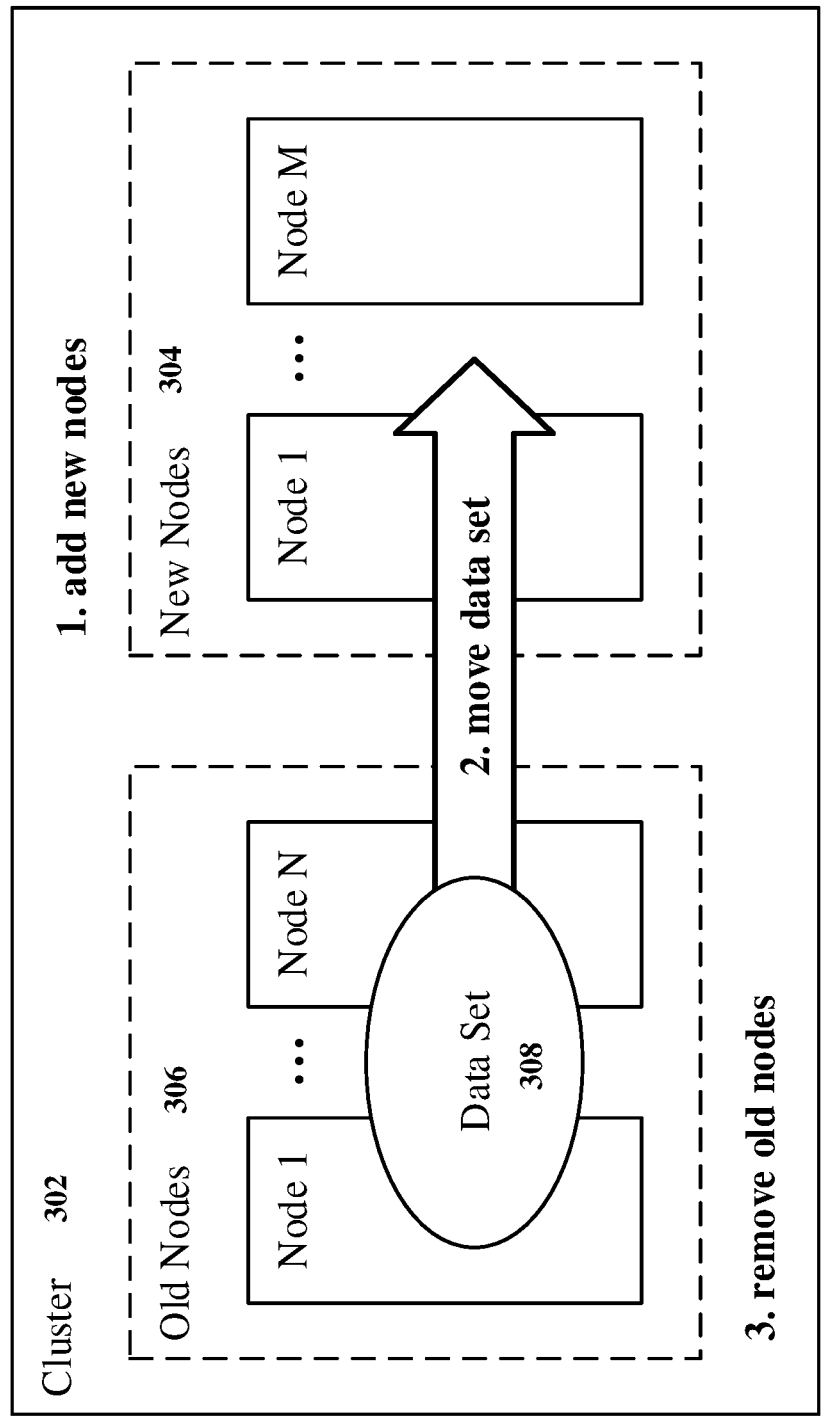
FIG. 3 illustrates a system for intra-cluster migration in accordance with one or more embodiments described herein.

FIG. 3 illustrates a system 300 for intra-cluster migration in accordance with one or more embodiments described herein. Repetitive description of like elements employed in other embodiments described herein is omitted for sake of brevity. The system 300 can comprise one or more of the components and/or functionality of the system 100, and vice versa.

The various embodiments described herein can seamlessly upgrade ECS cluster hardware 302. Some embodiments can be based on a three-step approach for hardware upgrade, referred to as Intra-Cluster Migration (ICM). The process of ICM can include, adding a new set of nodes (e.g., new nodes 304) to a cluster of old nodes 306. For example, the set of new nodes 304 can be next generation (next Gen) nodes (e.g., the target storage device 118) and can be added to the cluster of old nodes 306, which can be previous generation (prev Gen) nodes (e.g., the source storage device 116). As illustrated, the set of old nodes 306 comprises a first node (Node 1) through an Nth node (Node N), where N is an integer. Further, the set of new nodes 304 comprises a first node (Node 1) through Mth node (Node M), where M is an integer).

Upon or after addition of the new nodes 304, a data set 308 (e.g., the first data chunk 120) can be moved from the old nodes 306 to the new nodes 304. Upon or after movement of the data set 308, the set of old nodes 306 can be removed from the cluster.

According to the three-step approach of ICM for ECS, the data set is moved from old nodes to new nodes at the chunk level. That is, the three-step approach of ICM for ECS merely moves all chunks from old nodes to new nodes preserving their IDs.

All user data is stored in dedicated chunks called Repo chunks. Use of shared chunks for user data assures high performance and capacity efficiency when storage clients write data only. When storage clients delete data as well, it causes dead capacity within chunks. As a result, capacity efficiency becomes an issue. That is why ECS implements copying garbage collection for Repo chunks. User data from two or more poorly used chunks is copied to a new chunk. Offloaded chunks can be collected as garbage.

The three-step approach for ICM that moves a data set at the chunk level can have low efficiency when a significant part of Repo chunks is poorly used. Namely, there can be the problem that when the three-step ICM process moves a poorly used chunk, a significant part of data being moved is dead (e.g., unreachable). This can be a waste of system resources. Another problem can be that when the three-step ICM process moves a poorly used chunk, it moves live data, which can be a candidate for moving by the copying GC (Garbage Collector). Therefore, live data is to be moved twice instead of once. This can also waste system resources. The disclosed aspects can mitigate and/or reduce these wastes of system resources.

At a high level, the hybrid approached discussed herein can operate as follows. The ICM still works at the chunk level. However, the ICM process does not blindly move all chunks one by one. Instead, in the disclosed embodiments (e.g., the system 100) capacity use efficiency (e.g., used_capacity/chunk_size) of each chunk can be evaluated first.

If capacity use efficiency of a chunk is above (or at the same level with) a defined threshold, the chunk can be moved from old nodes (e.g., the source storage device 116) to new nodes (e.g., the target storage device 118) as-is, preserving its chunk ID. Alternatively, if capacity use efficiency of a chunk is below the defined threshold, live data from the (old) chunk can be moved to a new chunk allocated within new nodes. Dead data from the chunk is not moved. The old chunk can be deleted, and a capacity of the old chunk can be reclaimed.

For example, the defined threshold mentioned above can be an ICM threshold. The ICM threshold does not have to be equal to copying GC threshold (80% in ECS). On the one hand, data from chunks is to be moved anyway so it is a good moment to do copying garbage collection. This consideration can result in having as high an ICM threshold as possible (e.g. 100%). On the other hand, moving live data to new chunks means additional overhead (e.g., replication and update of objects' location information). This consideration can result in having an ICM threshold as close to copying GC threshold as possible (e.g. 80%). Then, using a mean value, the ICM threshold can be set to a value between 80% and 100%, (e.g., to the value of 90%). However, it should be understood that other values between 0% and 100% can be utilized with the disclosed embodiments, which are not limited to this example.

Figure 4:
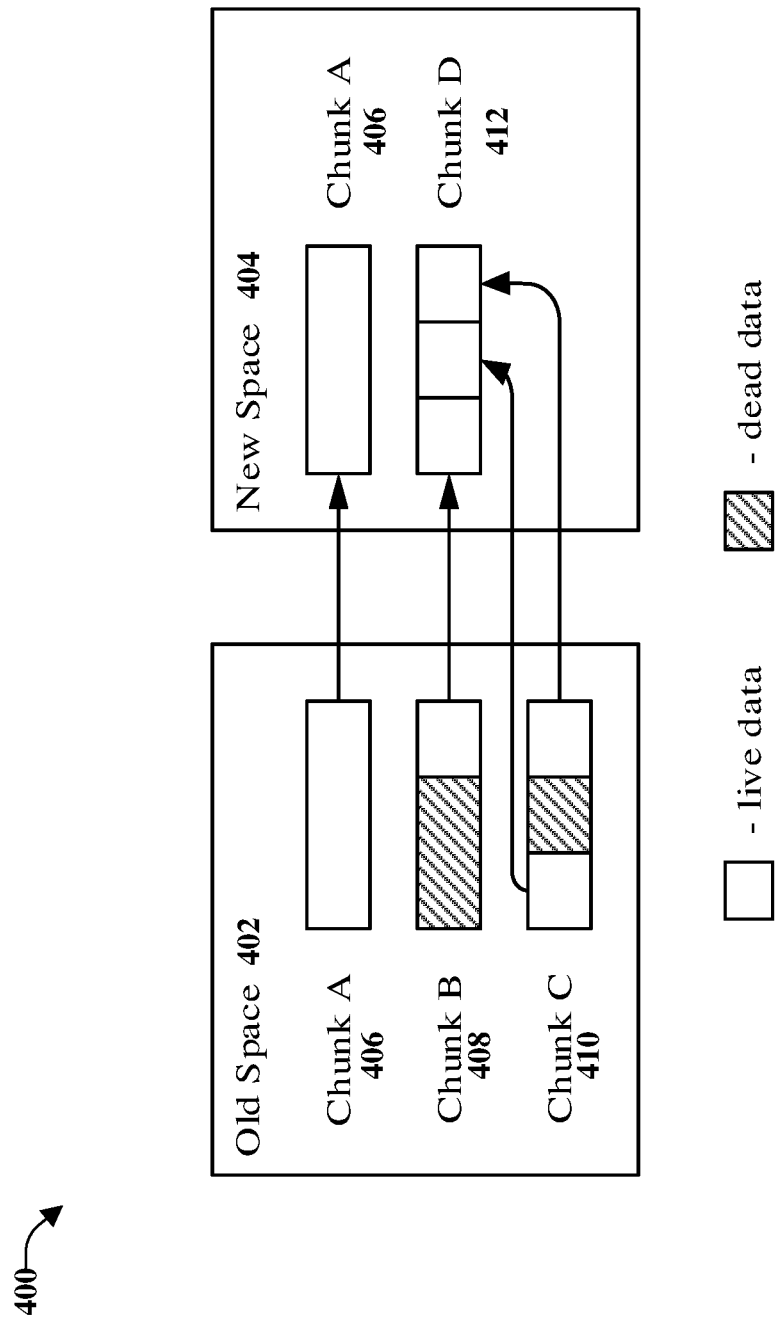
FIG. 4 illustrates an example, schematic representation of hybrid intra-cluster migration of data between storage devices in accordance with one or more embodiments described herein.

FIG. 4 illustrates an example, schematic representation 400 of hybrid ICM of data between storage devices for elastic cloud storage (ECS) in accordance with one or more embodiments described herein. Repetitive description of like elements employed in other embodiments described herein is omitted for sake of brevity.

Old nodes is the old space 402 (e.g., the source storage device 116) for chunks (e.g., the first data chunk 120), new nodes is the new space 404 (e.g., the target storage device 118) for chunks. In this example, the old space 402 comprises three data chunks, illustrated as Chunk A 406, Chunk B 408, and Chunk C 410.

Chunk A 406 can be full of live data (e.g., as determined by the analysis component 104). Therefore, Chunk A 406 can be moved (e.g., by the data migration component 106) via the ICM process "as-is." The ID of Chunk A 406 can be preserved (e.g., the ID of Chunk A 406 does not change when moved to the new space 404. Further, according to this example, parts of Chunk B 408 and Chunk C 410 can comprise dead data. For example, Chunk B 408 can comprise three portions, wherein one portion comprises live data and two portions comprise dead data. Further to this example, Chunk C 410 comprises three portions, two portions comprise live data and one portion comprises dead data. Thus, Chunk B 408 and Chunk C 410 are not moved "as-is." Instead, a new empty chunk, illustrated as Chunk D 412 can be created within the new space 404. The live data from Chunk B 408 and Chunk C 410 can be moved to Chunk D 412. Thus, the ICM process can complete migration without unwanted moving of dead data and with producing a set of chunks that do not need to be handled by the copying GC.

In further detail, new nodes can be physically added to a cluster and switched to an operation mode. The ECS platform can prepare the new storage devices and can start the storage services. The new storage services can join the old storage services to form a single cluster. Further, the new storage service can partition all DTs, such that the DTs are evenly distributed between the old nodes and the new nodes. This can assist with leveling the workload and reducing the negative effect of data move.

A shared memory service can incrementally (e.g., in several steps) make the new nodes members at the expense of the old members. This process should not take much time. The SSM can divide capacity of the new storage devices into a set of free blocks, and add them to SSMT. Further, the SSM can switch the old storage devices to no-write mode. This can prevent allocation of new free blocks on the old storage devices. From this moment, all new chunks can obtain capacity from the new storage devices only. Chunks that reside on the old storage devices, but are still open for writes, can still accept new data until the chunks are full. Free blocks on the old storage devices can be deleted from SSMT right away. Note that information about blocks still occupied by chunks should remain in SSMT to assure consistency between SSMT and CT (Chunk Table).

In an optional implementation, the SSM can calculate the amount of used capacity in the old storage devices and can reserve the same amount of free capacity in the new storage devices. Capacity for chunk moves can be allocated from this reservation. Capacity for new chunks can be allocated from outside this reservation. This can help to avoid a situation when a migration process gets stuck in the middle because there is not enough free capacity available.

It is noted that the above steps are preparatory. Upon or after they are completed, the Chunk Manager (CM) can perform actual data move from the old nodes to the new nodes. To do this the CM can iterate over Chunk Table (CT) and handle each chunk, which will now be described. If the chunk resides in the new nodes, then there is no further action necessary. If the chunk resides in the old nodes but is still open for new writes, then the chunk can be added to the backlog and processed later.

Alternatively, if the chunk resides in the old nodes and the chunk is immutable already (sealed), and its capacity use efficiency is at (or at the same level with) the ICM threshold, then the CM can check the health/consistency of the chunk and recover the chunk if needed. Further, the CM can allocate free capacity in the new nodes. The data (and the coding data) can be moved to the new location. The CM can also update the CT so that the chunk with the chunk ID references the new location. In addition, the CM can notify the SSM so that the SSM can update the SSMT accordingly. The old block occupied by the chunk can be permanently removed from SSMT.

Alternatively, if the chunk resides in the old nodes, and the chunk is immutable already (sealed), and its capacity use efficiency is below the ICM threshold, then the CM can check the health/consistency of the chunk and can recover the chunk if needed. Further, the CM can move live data to open for new writes chunks that reside in the new nodes. Note that in this case, the ICM process does not allocate new chunks. The ICM can process reused chunks, which are open for new objects. The CM can also notify Blob Service so that Blob Service can update location information for objects that had their segments moved to new chunks. In addition, the CM can notify the SSM so that the SSM can update the SSMT accordingly. The old block occupied by the chunk can be permanently removed from the SSMT.

Further, the CM can reiterate the chunks from the backlog. The CM can force chunks closed. For example, if a chunk is open for writes for any reason, the CM can force the chunk to close and not be available for new writes.

The CM (or a dedicated service) can wait until the migration process is completed. The migration process is completed when all VNest members are new nodes and/or the CM has moved all the chunks. The process is also completed when the old nodes are shut down (taken out of service) and/or physically removed. In some cases, the process is completed when all the new storage services rebalance partitions of all DTs. Further, the process is complete when the hardware upgrade is completed.

It is noted that new chunks, which accepted live data from old chunks, are a subject for protection and replication using standard routing. In other words, it can be performed without involvement of the ICM process.

Figure 5:
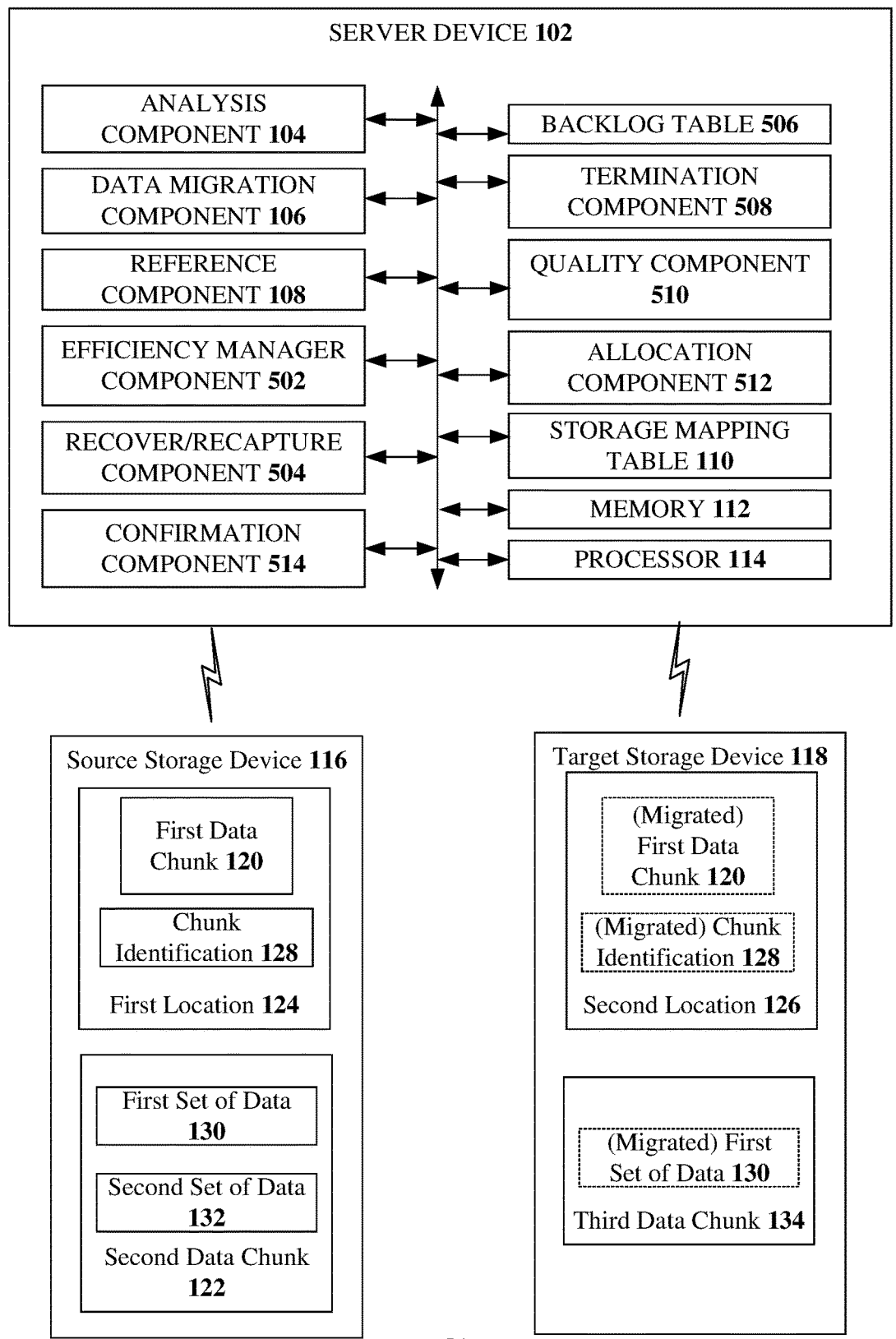
FIG. 5 illustrates another example, non-limiting, system for hybrid intra-cluster migration of data between storage devices in accordance with one or more embodiments described herein.

FIG. 5 illustrates another example, non-limiting, system 500 for hybrid intra-cluster migration of data between storage devices in accordance with one or more embodiments described herein. Repetitive description of like elements employed in other embodiments described herein is omitted for sake of brevity. The system 500 can comprise one or more of the components and/or functionality of the system 100, the system 300, and vice versa.

The server device 102 can comprise an efficiency manager component 502 that can determine respective use efficiencies of the data chunks prior to movement of the data chunks and/or portions thereof. For example, the efficiency manager component 502 can evaluate the data chunks individually. The use efficiency can be expressed as a percentage or in another manner.

If a use efficiency of a data chunk does not satisfy a configurable threshold use efficiency level, live data portions of the data chunk can be migrated, while dead portions of the data chunk are not migrated. For example, continuing the example of FIG. 1 and referencing FIG. 5, upon or after the first set of data 130, as well as other sets of data, is moved from the second data chunk 122 to the third data chunk 134, the recapture/recover component 504 can recover a capacity of the second data chunk 122 in the source storage device 116. In an example, the recapture component 504 can delete the non-moved portions (e.g., dead portions) of the data chunk.

In another example, prior to the data migration component 106 moving the first data chunk 120 and/or the second data chunks (or portions thereof), the analysis component 104 (or another system component) can determine that the first data chunk 120 and/or the second data chunk 122 comprise immutable data. However, according to some implementations, the first data chunk 120 does not comprise immutable data. According to these implementations, the analysis component 104 can determine that the first data chunk 120 is open for writes at the source storage device 116. Based on this determination, a reference of the first data chunk 120 can be added to a backlog table 506 (e.g., a backlog data structure) and a timer (not shown) can be started by the analysis component 104 (or another system component). After a defined interval (e.g., upon expiration of the timer), if the analysis component 104 determines the first data chunk 120 is still open for writes, a termination component 508 can force a closure of the first data chunk 120 at the source storage device 116. Upon or after the forced closure of the data chunk, the data chunk can be migrated to the target storage device 118 as discussed herein.

According to some implementations, to move the first data chunk 120 and the chunk identifier (e.g., the chunk identification 128), the data migration component 106 can eliminate repeated replication of the data chunk (as would be the case if the data were moved at the object level). In another implementation, the data migration component 106 can preserve locations of existing objects at the source storage device 116 based on movement of the first data chunk 120 and the chunk identifier.

In another example, prior to the data migration component 106 moving the data chunk, the efficiency manager component 502 can calculate a first amount of used capacity at the source storage device 116. Further, the efficiency manager component 502 can reserve a second amount of capacity in the target storage device 118. The first amount of used capacity and the second amount of capacity can be a similar amount of capacity as determined by a similarity criterion. For example, the first amount and second amount can be the same amount, or a similar amount that is within a defined percentage of one another.

According to another example, prior to the data migration component 106 moving the first data chunk 120, a quality component 510 can determine the data chunk is not consistent and can recover consistency of the first data chunk 120. Further to this example, an allocation component 512 can allocate an amount of available space in the target storage device 118. A confirmation component 514 can approve a movement of the first data chunk 120 based on a determination that the amount of available space allocated in the target storage device 118 is at a sufficient level to accommodate the first data chunk 120.

Methods that can be implemented in accordance with the disclosed subject matter, will be better appreciated with reference to the following flow charts. While, for purposes of simplicity of explanation, the methods are shown and described as a series of blocks, it should be understood and appreciated that the disclosed embodiments are not limited by the number or order of blocks, as some blocks can occur in different orders and/or at substantially the same time with other blocks from what is depicted and described herein. Moreover, not all illustrated blocks can be required to implement the disclosed methods. It should be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
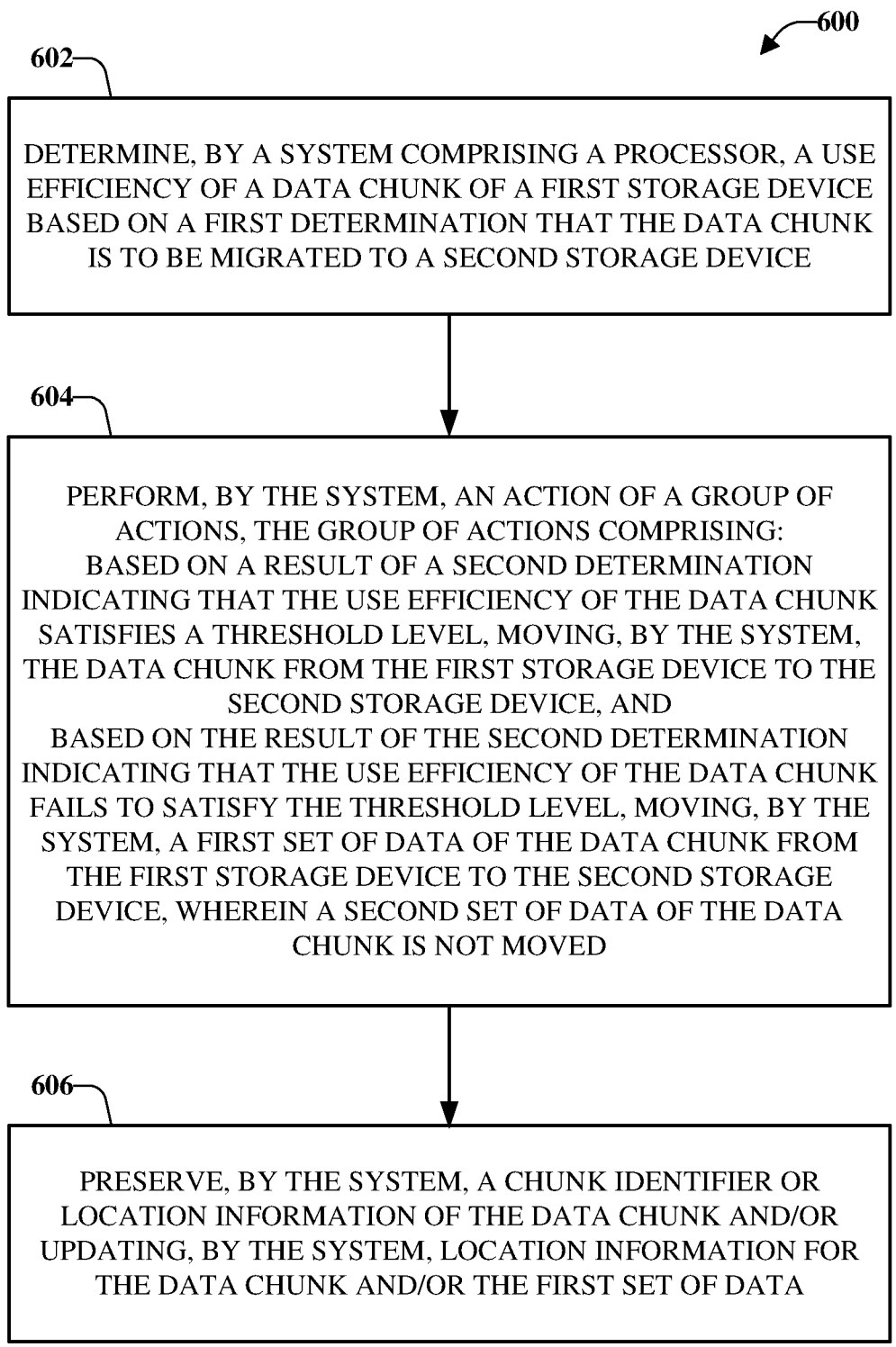
FIG. 6 illustrates a flow diagram of an example, non-limiting, computer-implemented method for hybrid intra-cluster migration in accordance with one or more embodiments described herein.

FIG. 6 illustrates a flow diagram of an example, non-limiting, computer-implemented method 600 for hybrid intra-cluster migration in accordance with one or more embodiments described herein. Repetitive description of like elements employed in other embodiments described herein is omitted for sake of brevity.

The various methods discussed herein can be utilized for a hardware upgrade that can be practical to implement. The methods can combine intra-cluster migration with copying garbage collection to solve the problem of low efficiency for poorly used chunks.

At 602 of the computer-implemented method 600, a system comprising a processor can determine a use efficiency of a data chunk (e.g., the first data chunk 120) of a first storage device (e.g., the source storage device 116) based on a first determination that the data chunk is to be migrated to a second storage device (e.g., the target storage device 118) (e.g., via the analysis component 104). The first storage device and the second storage device can be geographically distributed devices.

Further, at 604 of the computer-implemented method 600, the system can perform an action of a group of actions (e.g., via the data migration component 106). The group of actions comprises moving, by the system, the data chunk from the first storage device to the second storage device, based on a result of a second determination indicating that the use efficiency of the data chunk satisfies a threshold level. The group of actions also comprise moving, by the system, a first set of data of the data chunk from the first storage device to the second storage device, based on the result of the second determination indicating that the use efficiency of the data chunk fails to satisfy the threshold level. A second set of data of the data chunk is not moved. The first set of data can comprise live data that is referenced, and the second set of data can comprise dead data that is not referenced. In an example, the data chunk is a first data chunk and moving the first set of data comprises moving the first set of data from the first data chunk in the first storage device to a second data chunk in the second storage device. Further, prior to moving the data chunk, or prior to moving the first set of data, the system can determine that the data chunk comprises immutable data.

The computer-implemented method 600 also comprises, at 606, preserving a chunk identifier or location information of the data chunk (e.g., via the reference component 108 and/or the storage mapping table 110). For example, moving the data chunk can comprise moving the data chunk, information indicative of a coding location associated with the data chunk, and a chunk identifier associated with the data chunk from a first block in the first storage device to a second block in the second storage device. Additionally, or alternatively, at 606, the system can update location information for the data chunk and/or the first set of data. For example, location information for the first set of data can be updated to point to the second data chunk in the second storage device.

According to some implementations, the computer-implemented method 600 comprises, recovering a capacity of the first data chunk in the first storage device after moving, by the system, the first set of data. In some implementations, the computer-implemented method 600 comprises removing, by the system, the first block from the first storage device, wherein the first block is a storage block.

Figure 7:
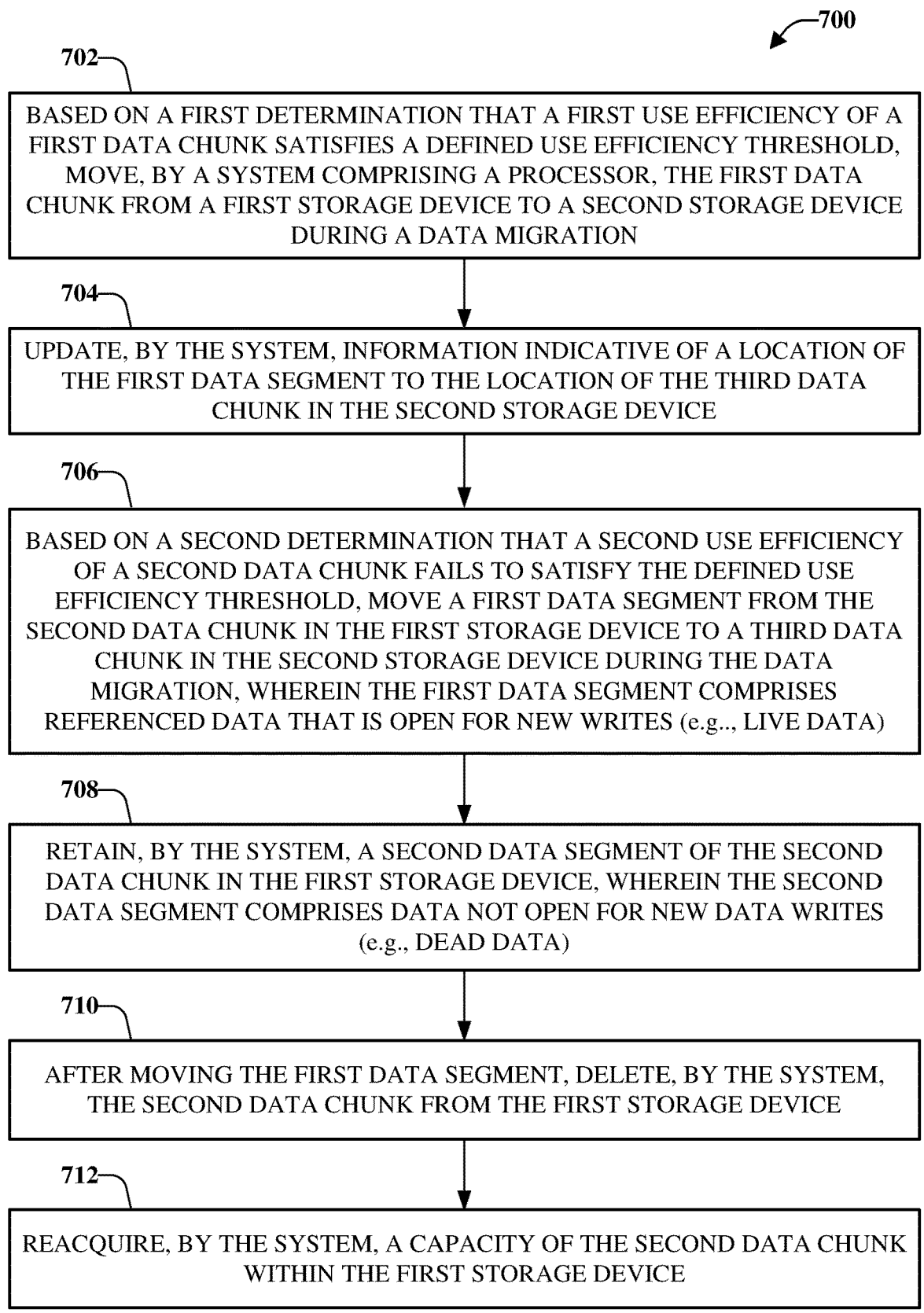
FIG. 7 illustrates a flow diagram of an example, non-limiting, computer-implemented method for moving a data chunk and/or data segments of a data chunk in accordance with one or more embodiments described herein.

FIG. 7 illustrates a flow diagram of an example, non-limiting, computer-implemented method 700 for moving a data chunk and/or data segments of a data chunk in accordance with one or more embodiments described herein. Repetitive description of like elements employed in other embodiments described herein is omitted for sake of brevity.

At 702, based on a first determination that a first use efficiency of a first data chunk satisfies a defined use efficiency threshold, the first data chunk is moved from a first storage device to a second storage device during a data migration (e.g., via the data migration component 106). Information indicative of a location of the first data segment is updated, at 704, to the location of the third data chunk in the second storage device (e.g., via the reference component 108 and/or the storage mapping table 110).

Further, at 706, based on a second determination that a second use efficiency of a second data chunk fails to satisfy the defined use efficiency threshold, a first data segment from the second data chunk in the first storage device is moved to a third data chunk in the second storage device during the data migration e.g., via the data migration component 106), wherein the first data segment comprises referenced data that is open for new writes (e.g., live data). A second data segment of the second data chunk can be retained in the first storage device, at 708 (e.g., via the data migration component 106), wherein the second data segment comprises data not open for new data writes (e.g., dead data).

Upon or after moving the first data segment, at 710, the second data chunk is deleted from the first storage device (e.g., via the recapture component 504). A capacity of the second data chunk within the first storage device is reacquired, at 712 (e.g., via the recapture component 504). Accordingly, efficiency of poorly used data chunks can be improved.

Figure 8:
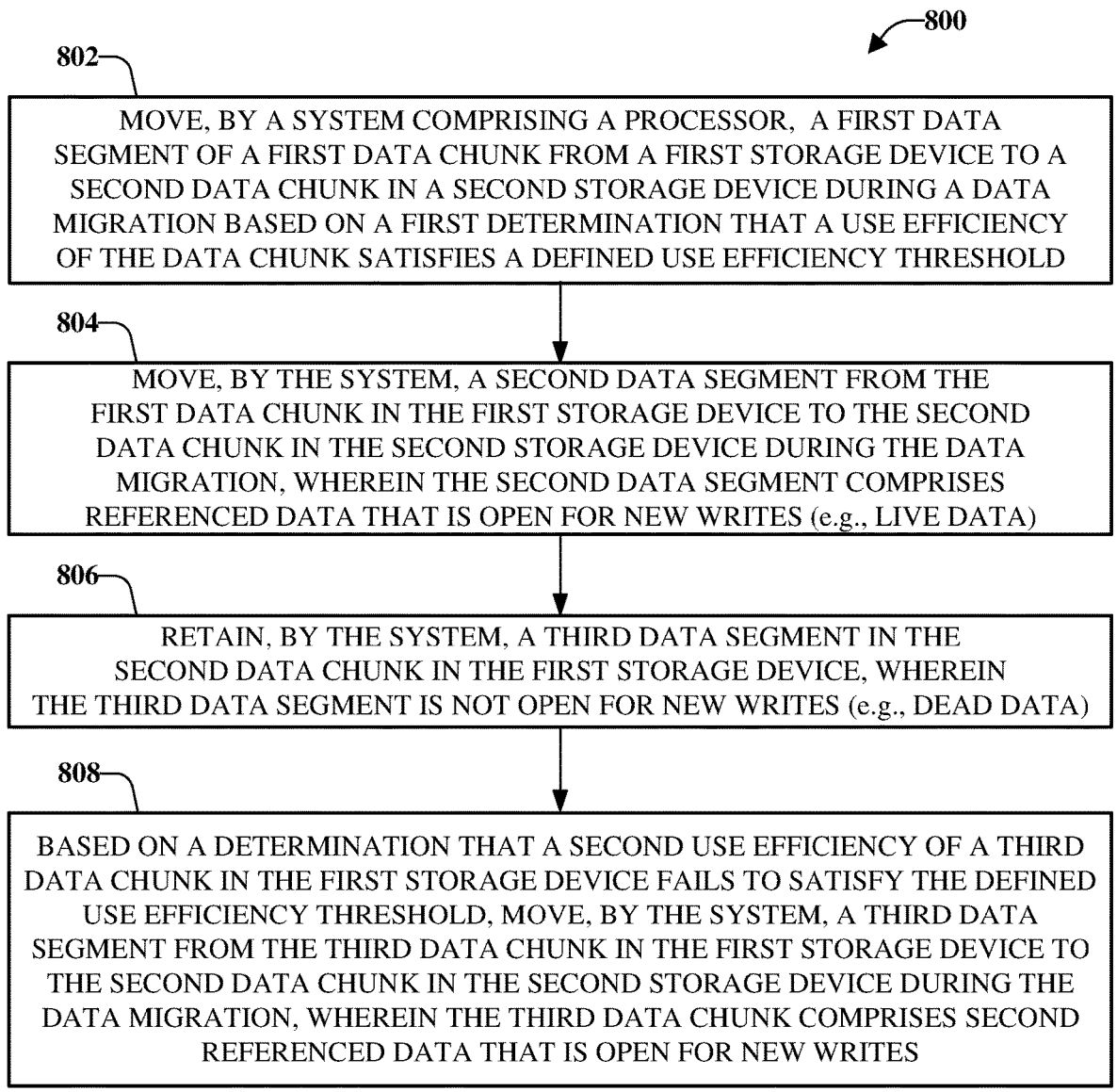
FIG. 8 illustrates a flow diagram of an example, non-limiting, computer-implemented method for moving multiple data segments of multiple data chunks from a first storage device to a second storage device in accordance with one or more embodiments described herein.

FIG. 8 illustrates a flow diagram of an example, non-limiting, computer-implemented method 800 for moving multiple data segments of multiple data chunks from a first storage device to a second storage device in accordance with one or more embodiments described herein. Repetitive description of like elements employed in other embodiments described herein is omitted for sake of brevity.

The computer-implemented method 800 starts, at 802, with moving, by a system comprising a processor, a first data segment of a first data chunk from a first storage device to a second data chunk in a second storage device (e.g., via the data migration component 106). The first data chunk is moved during a data migration based on a first determination that a first use efficiency of the first data chunk satisfies a defined use efficiency threshold.

At 804, a second data segment from the first data chunk in the first storage device is moved to the second data chunk in the second storage device during the data migration (e.g., via the data migration component 106), where the second data segment comprises referenced data that is open for new writes (e.g., live data).

At 806, a third data segment in the first data chunk in the first storage device is retained (e.g., via the data migration component 106). The determination to retain the third data segment in the first data chunk can be based on a determination that the third data segment is not open for new writes (e.g., dead data).

Further, according to some implementations, at 808, a third data segment is moved from the third data chunk in the first storage device to the second data chunk in the second storage device during the data migration based on a determination that a second use efficiency of a third data chunk in the first storage device fails to satisfy the defined use efficiency threshold, at 808 (e.g., via the data migration component 106). The third data chunk can comprise second referenced data that is open for new writes (e.g., live data).

Figure 9:
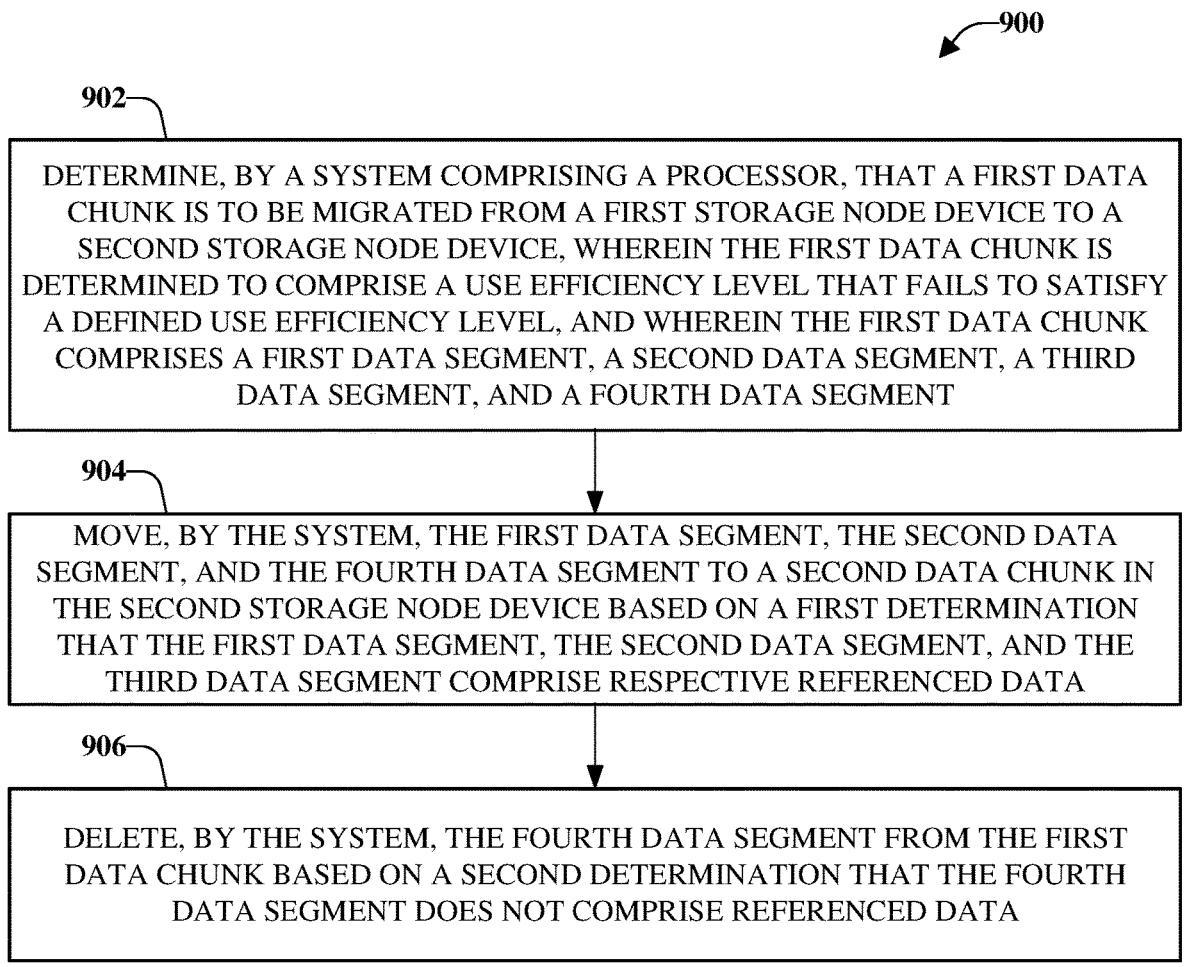
FIG. 9 illustrates a flow diagram of an example, non-limiting, computer-implemented method for moving one or more data segments of a data chunk from a first storage node device to a second storage node device in accordance with one or more embodiments described herein.

FIG. 9 illustrates a flow diagram of an example, non-limiting, computer-implemented method 900 for moving one or more data segments of a data chunk from a first storage node device to a second storage node device in accordance with one or more embodiments described herein. Repetitive description of like elements employed in other embodiments described herein is omitted for sake of brevity.

At 902 of the computer-implemented method 900, a determination is made that a first data chunk is to be migrated from a first storage node device to a second storage node device (e.g., via the analysis component 104). For example, the first data chunk can be determined to comprise a use efficiency level that fails to satisfy a defined use efficiency level, and further where the first data chunk comprises a first data segment, a second data segment, a third data segment, and a fourth data segment. However, it is noted that data chunks can comprise fewer and/or more than four data segments.

At 904, the first data segment, the second data segment, and the fourth data segment are moved to a second data chunk in the second storage node device based on a first determination that the first data segment, the second data segment, and the third data segment comprise respective referenced data (e.g., via the data migration component 106). The fourth data segment is deleted from the first data chunk, at 906, based on a second determination that the fourth data segment does not comprise referenced data (e.g., via the recapture component 504).

According to some implementations, the computer-implemented method 900 comprises updating respective location information for the first data segment, the second data segment, and the third data segment. The respective location information can comprise a reference to the second data chunk in the second storage node device. Further, in accordance with some implementations, the computer-implemented method 900 can comprise, removing the first data chunk from the first storage node device and regaining a capacity of the first data chunk in the first storage node device.

Figure 10:
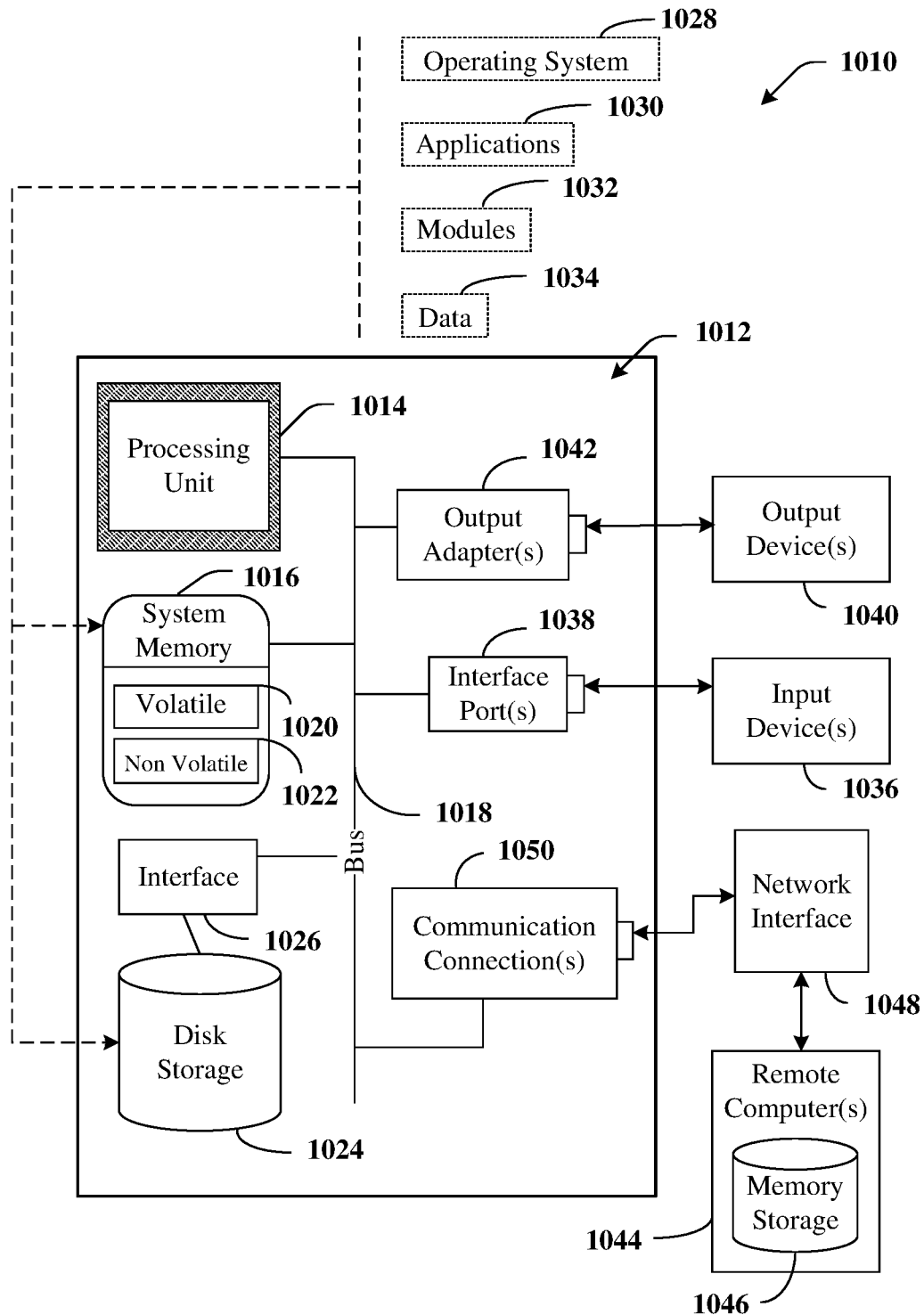
FIG. 10 illustrates an example, non-limiting, computing environment in which one or more embodiments described herein can be utilized.

In order to provide a context for the various embodiments of the disclosed subject matter, FIG. 10 as well as the following discussion are intended to provide a brief, general description of a suitable environment in which the various aspects of the disclosed subject matter can be utilized.

With reference to FIG. 10, an example environment 1010 in which various embodiments of the aforementioned subject matter can be implemented comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus, a peripheral bus or external bus, and/or a local bus using any variety of available bus architectures including, but not limited to, 8-bit bus, Industry Standard Architecture (ISA), Micro-Channel Architecture (MSA), Extended ISA (EISA), Integrated Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), static DRAM (SDRAM), double data rate SDRAM (DDR SDRAM), enhanced SDRAM (ESDRAM), Synchronous Link DRAM (SLDRAM), and Direct Rambus® RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz® drive, Zip® drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It should be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It should be appreciated that one or more embodiments described in the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, television (TV) tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB) port. Output device(s) 1040 use some of the same type of ports as input device(s) 1036. Thus, for example, a USB port can be used to provide input to computer 1012, and to output information from computer 1012 to an output device 1040. Output adapter(s) 1042 are provided to illustrate that there are some output devices 1040 like monitors, speakers, and printers, among other output devices 1040, which require special adapters. The output adapter(s) 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer (PC), a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LANs) and wide-area networks (WANs). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSLs).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, Integrated Services Digital Network (ISDN) adapters, and Ethernet cards.

Figure 11:
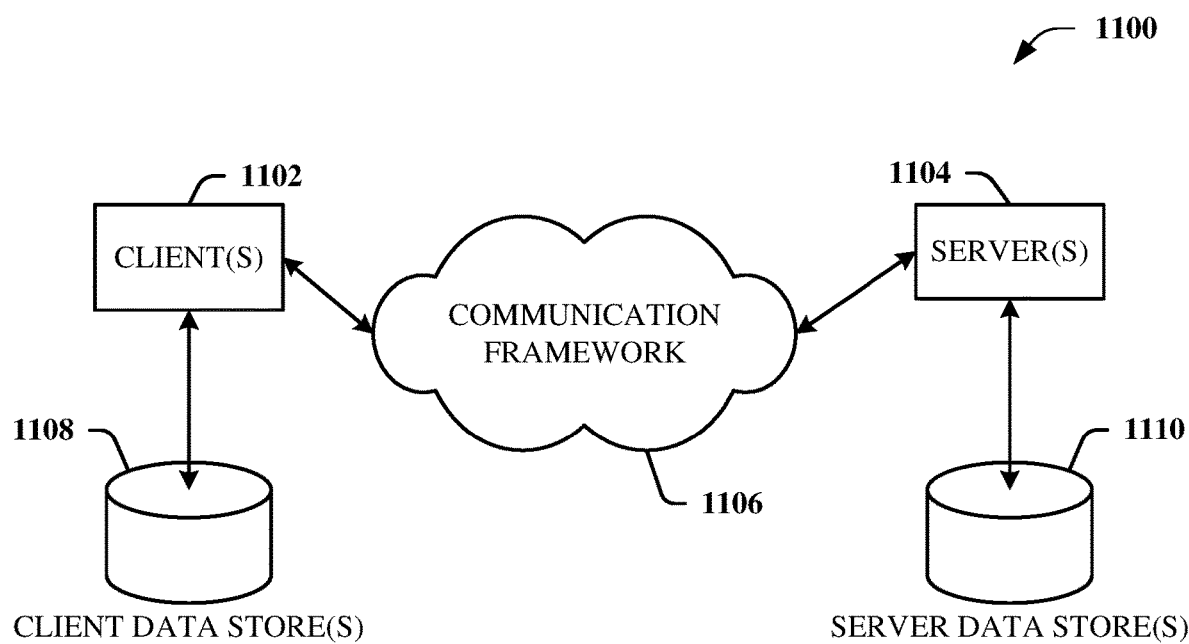
FIG. 11 illustrates an example, non-limiting, networking environment in which one or more embodiments described herein can be utilized.

FIG. 11 is a schematic block diagram of a sample computing environment 1100 in which the disclosed subject matter can be implemented. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed for communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, where the electronic components can comprise a processor therein to execute software or firmware that confer(s) at least in part the functionality of the electronic components. In an embodiment, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, random access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital versatile disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments should neither be presumed to be exclusive of other disclosed embodiments, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one of ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it should be understood that other similar embodiments can be used or modifications and additions made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a processor of a computer system, a first use efficiency of a first data chunk of a first storage device satisfies a threshold usage level based on a first determination that the first data chunk is to be migrated to a second storage device;
   determining, by the processor, that a second use efficiency of a second data chunk of the first storage device and a third use efficiency of a third data chunk of the first storage device fail to satisfy the threshold usage level based on a second determination that the second data chunk and the third data chunk are to be migrated to the second storage device;
   moving, by the processor, the first data chunk from the first storage device to the second storage device; and
   moving, by the processor, first live data of the second data chunk and second live data of the third data chunk into a fourth data chunk of the second storage device, wherein the moving the first data chunk is performed at a same time as moving the first live data of the second data chunk and the second live data of the third data chunk, wherein first dead data of the second data chunk and second dead data of the third data chunk are not moved with the moving of the second data chunk and the third data chunk.

2. The method of claim 1, wherein the moving of the first data chunk comprises moving the first data chunk as-is while preserving an identification of the first data chunk at the second storage device.

3. The method of claim 2, further comprising:
   updating, by the processor, a first location information for the first live data of the second data chunk to point to the fourth data chunk in the second storage device; and
   updating, by the processor a second location information for the second live data of the second data chunk to point to the fourth data chunk in the second storage device.

4. The method of claim 2, further comprising, after the moving of the first data chunk from the first storage device, recovering, by the processor, a capacity of the first data chunk in the first storage device.

5. The method of claim 1, wherein the moving the first data chunk comprises:
   moving the first data chunk, coding data indicative of a location associated with the first data chunk, and a chunk identifier associated with the first data chunk.

6. The method of claim 5, further comprising:
   deleting, by the processor, the first data chunk from the first storage device, wherein the first data chunk is a storage block.

7. The method of claim 1, further comprising:
   prior to the moving of the first data chunk, determining, by the processor, that the first data chunk comprises immutable data.

8. The method of claim 1, wherein the first data chunk comprises live data that is referenced.

9. The method of claim 1, wherein the first storage device and the second storage device are geographically distributed devices.

10. The method of claim 1, further comprising:
deleting, by the processor, the first dead data of the second data chunk and the second dead data of the third data chunk from the first storage device.

11. The method of claim 1, wherein the first dead data of the second data chunk and the second dead data of the third data chunk are data that is not referenced.

12. A system, comprising:
a processor; and
a memory that stores executable instructions that, when executed by the processor, cause the processor to perform operations, the operations comprising:
determining that a first use efficiency of a first data chunk satisfies a defined use efficiency threshold;
determining that a second use efficiency of a second data chunk and a third use efficiency of a third data chunk fail to satisfy the defined use efficiency threshold;
moving the first data chunk from a first storage device to a second storage device;
moving a first data segment from the second data chunk in the first storage device to a fourth data chunk in the second storage device; and
moving a second data segment from the third data chunk in the first storage device to the fourth data chunk in the second storage device, wherein the moving of the first data segment and the moving of the second data segment is performed during the moving the first data chunk.

13. The system of claim 12, wherein the operations further comprise:
updating first information indicative of a first location of the first data segment and second information indicative of a second location of the second data segment to third information indicative of a third location of the second data chunk in the second storage device.

14. The system of claim 12, wherein the operations further comprise:
after moving the first data segment, deleting the second data chunk from the first storage device; and
reacquiring a capacity of the second data chunk within the first storage device.

15. The system of claim 12,
wherein the first data segment and the second data segment comprise respective referenced data that is open for new writes.

16. The system of claim 12, wherein the operations further comprise:
determining that a third use efficiency of a fourth data chunk fails to satisfy the defined use efficiency threshold, moving a third data segment from the fourth data chunk in the first storage device to the second data chunk in the second storage device during the moving the first data chunk, wherein the fourth data chunk comprises second referenced data that is open for new writes.

17. The system of claim 12, wherein the operations further comprise:
prior to the moving of the first data chunk and the moving of the first data segment and the second data segment, determining that the first data chunk, the first data segment of the second data chunk, and the second data segment of the third data chunk comprise immutable data.

18. A non-transitory computer-readable medium comprising instructions that, when executed by a processor of a computing system, cause the processor to perform operations, the operations comprising:
determining a first data chunk is to be migrated from a first storage node device to a second storage node device, wherein the first data chunk is determined to comprise a first use efficiency level that satisfies a defined use efficiency level,
determining that a second data chunk comprises a first data segment that is to be migrated from the first storage node device to the second storage node device, wherein the second data chunk is determined to comprise a second use efficiency level that fails to satisfy the defined use efficiency level;
determining that a third data chunk comprises a second data segment that is to be migrated from the first storage node device to the second storage node device, wherein the third data chunk is determined to comprise a third use efficiency level that fails to satisfy the defined use efficiency level;
moving the first data chunk, the first data segment, and the second data segment from the first storage node device to the second storage node device; and
deleting a third data segment of the second data chunk, and a fourth data segment of the third data chunk from the first storage node device based on a determination that the third data segment and the fourth data segment do not comprise referenced data.

19. The non-transitory computer-readable medium of claim 18, wherein the operations further comprise updating respective location information for the first data segment and the second data segment, and wherein the respective location information comprises a reference to the second data chunk in the second storage node device.

20. The non-transitory computer-readable medium of claim 18, wherein the operations further comprise:
removing the first data chunk from the first storage node device; and
regaining a capacity of the first data chunk in the first storage node device.

* * * * *